April 29, 1958 W. S. COMPTON 2,832,216
FUEL MILEAGE TESTER
Filed Jan. 23, 1956
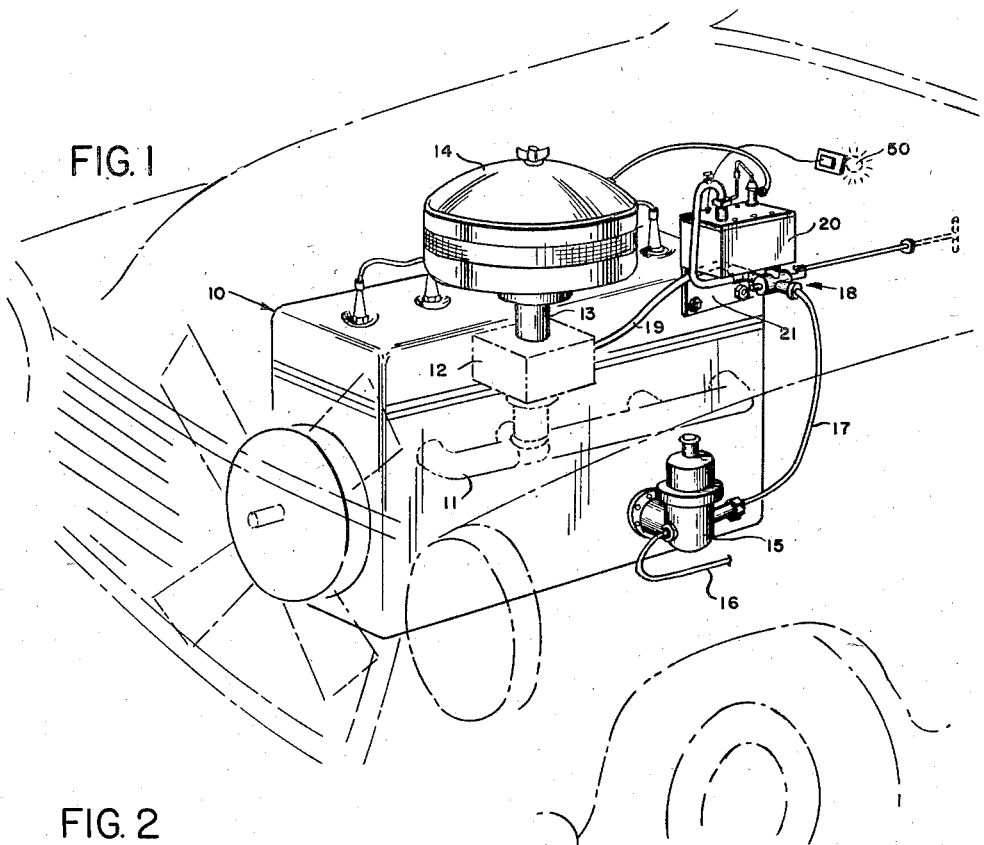
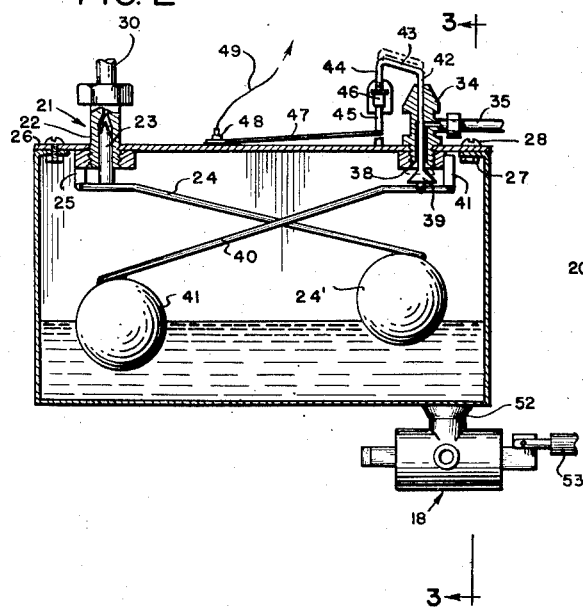
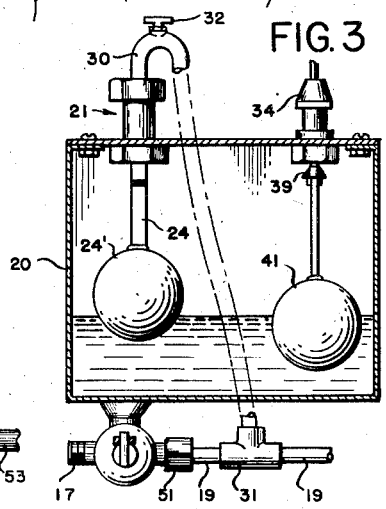
INVENTOR
W. S. COMPTON
BY *Ayates Dowee*
ATTORNEY

United States Patent Office 2,832,216
Patented Apr. 29, 1958

2,832,216

FUEL MILEAGE TESTER

William S. Compton, Birmingham, Ala.

Application January 23, 1956, Serial No. 560,583

5 Claims. (Cl. 73—113)

This invention relates to measuring devices and more particularly to those employed for measuring the mileage of a vehicle or the like on a predetermined quantity of fuel.

Various devices have been proposed heretofore for determining the fuel consumption of a vehicle but these have frequently been complicated or expensive or difficult to use; others have presented a hazard to safe operation.

The most common way of determining fuel consumption is probably that of checking the mileage between stops for refueling. This requires a substantial amount of driving under varying conditions of operation and is subject to other inaccuracies such as the angle of inclination of the tank at the time it is filled.

Accordingly, it is an object of the present invention to provide a relatively simple, reliable, and safe fuel mileage tester which an operator of a vehicle may use with a minimum of difficulty.

A further object is the provision of a fuel mileage tester which may be used repeatedly without the necessity of stopping the vehicle or raising the hood.

A further object is the provision of a fuel mileage tester which is provided with a vent for carrying off fuel vapor in order to reduce the safety hazard.

Briefly stated the invention includes a fuel container which is connected by a three-way valve at its lower portion to the carburetor of the vehicle. The carburetor leg has a T connection extending to a float operated valve having an inlet at the top of the container in order to maintain a predetermined quantity of fuel. The other leg of the three-way valve is attached to the line from the fuel pump. The fuel container has a vent which is connected to the air intake to the carburetor for carrying off fuel vapor; the vent is controlled by a second float connected to an electrical contact which operates a signal, such as a light, when the second float drops to a predetermined position. Thus, the container is normally maintained filled to a predetermined level and may be drained directly into the carburetor, the operator receiving a signal when the measured quantity has been dispensed.

The invention contemplates that the container will accommodate along with the amount of fuel in the line and in the carburetor one-tenth of a gallon so that upon the exhaustion of the same and the multiplication of the mileage reading by ten, the number of miles per gallon may be obtained.

Further objects and advantages of the invention will be apparent from the following description in conjunction with the accompanying drawing, wherein:

Fig. 1 is a diagrammatic view illustrating the application of the invention to an internal combustion engine of a motor vehicle;

Fig. 2, an enlarged longitudinal vertical section of one embodiment of the invention; and Fig. 3, a section on the line 3—3 of Fig. 2.

With continued reference to the drawing, the vehicle fragmentarily illustrated has a motor 10 with a fuel mixture intake 11 supplied by a carburetor 12 having an air intake 13 with an air cleaner 14. A fuel pump 15 receives fuel through line 16 and pumps it into a supply line 17. Supply line 17 is connected to a three-way valve 18 which in one position permits fuel to flow directly into line 19 to the carburetor.

In order to measure a small quantity of fuel and dispense the same to the carburetor during the test, a fuel container or tank 20 is provided which in the illustration is substantially rectangular and has a supporting flange 21 connected to the motor 10 by suitable fastening means. The tank 20 has an inlet valve 21 having a seat 22 and a needle valve member 23, the latter of which is mounted on float arm 24 having float 24', the float arm being pivotally connected by arm 25 to the top 26 of the container. Top 26 is securely held on the inturned side flanges 27 at the upper portion of the tank by suitable fastening means 28. The inlet valve 21 is connected to tube 30 which has its other end connected to T 31 in line 19. Tube 30 has a shutoff valve 32 for stopping flow into the tank when desired.

Positioned at substantially the opposite end of the tank and connected to the top 26 is an air vent member 34 having a vent line 35 attached to the air cleaner 14 of the carburetor. The lower portion of the vent member 34 is exposed to the interior of the container and has a conical seat 38 for receiving a valve member 39. The valve member 39 is mounted on float arm 40 which is pivotally connected by strut 41 to the top of the container.

Float 41 is positioned somewhat lower in the container than float 24' in order that the vent will remain securely closed except when the level of fuel has dropped below the maximum for which arm 24 is set.

Connected to the valve member 39 is a rod 42 which has a return bend portion 43 with a contact arm 44 at its other end. The contact arm 44 has a tip portion 45 threadedly connected by adjustable fastening means 46. A contact member 47 is mounted on the top 26 of the container and is positioned to engage the tip portion 45. The tip portion 45 has a conductor of suitable material 47 connected thereto which is connected by fastening member 48 to a wire 49 which extends within the dash compartment to a bulb 50. Bulb 50 is connected to the battery or other suitable power source, preferably through the ignition circuit. The fastener 48 and wire 49 and conductor 47 are suitably insulated from the top 26.

The three-way valve 18, in addition to the inlet leg 17 which is connected to the fuel pump and the discharge leg 51 which is connected to line 19, has a third leg 52 connected to the bottom of the tank 20. The valve is operated by a lever 53 which extends beyond the fire wall of the vehicle to within easy reach of the operator. In one position the valve 18 permits flow between legs 17 and 51, the leg 52 being closed; in a second position the valve 18 permits flow between the legs 52 and 51, the leg 17 being closed.

In the operation of the device the three-way valve 18 is positioned to permit flow between legs 17 and 51, leg 52 being closed. With the valve 18 in this position fuel flows from the fuel pump through the valve 18 to the T 31. From T 31 fuel flows to the carburetor through the line 19 and into the tank 20 through line 30 and valve 21. Fuel continues flowing into tank 20 until valve 21 closes, the tank being maintained filled to a predetermined level by operation of valve 21.

When a test is desired lever 53 is operated to change the position of the three-way valve. In the new position leg 17 from the fuel pump is closed and leg 52 is open which permits fuel within the container 20 to drain directly through fuel line 19 to the carburetor. As the level in container 20 drops float 41 is lowered which permits valve 39 to open for the purpose of venting through connection 35. When float 41 has dropped to a predetermined level the tip portion 45 of the electrical contact engages contact 47 which completes the circuit to light signal 50 on the dashboard.

Thus, when the operator wishes to test the mileage, after leaving the three-way valve in the first position a brief time in order that tank 20 may be filled to the proper level, he operates the lever 53, at the same time noting his speedometer mileage, and when the light 56 comes on, he notes the mileage again and multiplies the difference by ten to obtain his mileage per gallon. He may wish to make several tests under similar or different driving conditions and has only to wait a brief time between tests to permit the container to become refilled. When he completes a series of tests or does not wish to use the device for an indefinite time, he may close the shutoff valve 32 in line 30 which will prevent fuel from flowing into the tank through the valve 21.

Accordingly, it will be understood that the invention includes a small fuel container which may be attached adjacent to the carburetor and which is normally maintained filled so that a predetermined quantity of fuel may be dispensed to the carburetor at any time, both the actuating means for the tester and a signal indicating when the test quantity has been dispensed being located within reach and observation of the operator and eliminating the necessity for his stopping the vehicle or raising the hood in order to make the test.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A fuel mileage tester comprising a fuel container, a three-way valve connected to the lower portion of the container and having one leg for draining fuel therefrom, a second leg for attachment to a fuel pump, and a third leg for attachment to a carburetor, the third leg also being connected to a supply line for the container, a float controlled valve connected to the supply line for the container and permitting fuel to be received up to a predetermined level, an actuator for the three-way valve extending into proximity to an operator's position, said actuator in a first position causing the second and third legs to be connected and in a second position causing the first and third legs to be connected, a vent connected to the upper portion of the container above the maximum level of fuel, a second float valve controlling the vent and permitting venting therethrough when the liquid level has dropped below the predetermined maximum, a contact arm connected to the second float valve, a signal mounted within observation of an operator, and circuit means connected to the signal and adapted to be closed to actuate the signal when the level within the container has dropped to a predetermined minimum.

2. A fuel mileage tester comprising a fuel container for connection between the fuel source and a motor, a valve connected to the lower portion of the container and having one position in which the fuel source is connected to the motor and a second position in which the lower portion of the container is connected to the motor, supply means connecting the upper portion of the container to the connection between the lower portion of the container and the motor, a float control valve connected to the supply means for the container and permitting fuel to be received up to a predetermined maximum level, an actuator for the valve extending into proximity to an operator's position, a vent connected to the upper portion of the container above the maximum level of fuel, a second float valve controlling the vent and permitting venting therethrough when the liquid level has dropped below the predetermined maximum, a contact arm connected to the second float valve, a signal mounted on the vehicle within observation of an operator, and circuit means connected to the signal and adapted to be closed to actuate the signal when the level within the container has dropped to a predetermined minimum.

3. A fuel mileage tester comprising a fuel container for connection between a source of fuel and a motor, said container having a float controlled vent valve, operator controlled means for alternately connecting the fuel source to the motor and to a supply line to the upper portion of the fuel container or the lower portion of the fuel container to the motor, a liquid level responsive float valve within the container communicating with the supply line to the upper portion of the said fuel container for maintaining a predetermined amount of fuel in said container, said float controlled vent valve permitting venting therethrough when the liquid level has dropped below said predetermined amount, a contact arm connected to said float controlled vent valve, a signal mounted on the vehicle within perception of an operator, and an electrical circuit between said contact arm and said signal adapted to be closed when the level within the container has dropped to a predetermined minimum.

4. The invention of claim 3 in which the vent is connected to the air intake of the carburetor for permitting vapor to be exhausted thereto without accumulating in the air space around the motor.

5. The invention of claim 3, the liquid level responsive float for the vent being normally immersed further into the liquid fuel than the float for the container supply line, whereby the vent will remain closed during the slight adjustment of level in the fuel container and the line will be opened upon a substantial drop of the level.

References Cited in the file of this patent

UNITED STATES PATENTS

| | | |
|---|---|---|
| 2,118,079 | Goode et al. | May 24, 1938 |
| 2,550,227 | Compton | Apr. 24, 1951 |
| 2,652,719 | Bracci | Sept. 22, 1953 |